R. C. WATROUS.
HORSESHOE CALK.
APPLICATION FILED AUG. 22, 1910.

999,685.

Patented Aug. 1, 1911.

WITNESSES:
E. J. Ogden
J. L. Macdermott.

INVENTOR
RALPH C. WATROUS
BY
Howard E. Barlow
ATTORNEY

UNITED STATES PATENT OFFICE.

RALPH C. WATROUS, OF PROVIDENCE, RHODE ISLAND, ASSIGNOR TO RHODE ISLAND PERKINS HORSE SHOE COMPANY, OF PROVIDENCE, RHODE ISLAND, A CORPORATION OF NEW JERSEY.

HORSESHOE-CALK.

999,685.     Specification of Letters Patent.     Patented Aug. 1, 1911.

Application filed August 22, 1910. Serial No. 578,411.

*To all whom it may concern:*

Be it known that I, RALPH C. WATROUS, a citizen of the United States, residing at the city of Providence, in the county of Providence and State of Rhode Island, have invented certain new and useful Improvements in Horseshoe-Calks, of which the following is a specification, reference being had therein to the accompanying drawing.

This invention relates to calks for horse shoes, and has particular reference to the structure of the spur or prong by means of which the calk is attached to the shoe so that it will remain in position during the welding operation.

The object of the invention is to provide a calk having a prong so shaped that although it consists of a single piece, will spread when driven into the shoe so as to hold the calk firmly in place.

The invention consists in the calk substantially as hereinafter described and claimed.

Figure 1:
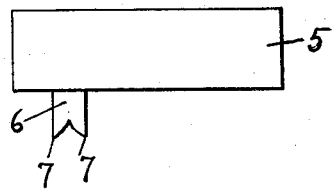
Figure 2:
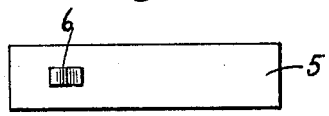
Figure 3:
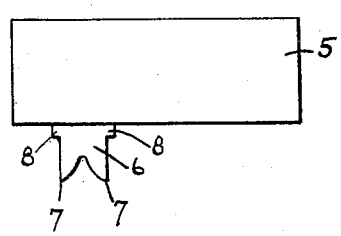

Of the accompanying drawings, Figure 1— is a side elevation of a horse shoe calk embodying my invention. Fig. 2— is an under plan view of the same. Fig. 3— is a view similar to Fig. 1 but showing a slightly different form of attaching spur or prong.

Similar reference characters indicate the same or similar parts in all of the figures.

The body 5 of the calk may be of any preferred shape longitudinally or in cross section, and I do not attempt to illustrate in the drawing any special shape thereof. The prong 6, which is usually integral with the body 5 is rectangular in cross section, as indicated in Fig. 2, the tip being bifurcated to form two sharp edges 7—7. When the prong is constructed as shown in Figs. 1 and 2, the outer edges thereof are parallel, while the sides of the recess resulting from splitting the tip of the prong to form the sharp edges 7—7 are preferably slightly convex. The result is that when the prong is inserted in the usual hole in the horse shoe, and the calk is struck by a hammer to drive the prong into the hole, the convex sides of the recess in the end of the prong so engage the bottom of the hole in the horse shoe as to cause the points 7—7 to spread apart so that the prong will be clamped in place so firmly that there is no liability of its getting out of position during the heating operation preliminary to the welding of the calk to the shoe.

Owing to the fact that the prong has flat sides and practically parallel outer edges, its tip will divide or spread as described without twisting or turning and therefore the calk will be properly seated, and will remain in proper position during the welding.

In Fig. 3 the prong is illustrated as having shoulders 8—8 near its base. These shoulders possess the function of insuring a tight closing of the metal of the shoe around the prong when the calk is driven to its seat, This will be best understood by explaining that frequently the hole in the horse shoe is of such size that when a prong having entirely straight parallel sides is driven thereinto there will be a slight space existing between one or both side edges of the prong and the side walls of the hole in the horse shoe. With the structure such as shown in Fig. 3, when the prong 6 is driven into the hole, the shoulders 8—8 engage the surface of the shoe each side of the hole and then upon being driven completely down, said shoulders press the metal of the horse shoe inwardly so as to fill up any space that might exist between the walls of the hole and the edges of the prong.

It will now be understood that I have provided a horse shoe calk having a prong, which, when the calk is driven to its seat, will cause the calk to be held firmly to the shoe while it is being welded, this hold not only keeping the base of the calk closely against the surface of the horse shoe, but also preventing any possibility of the calk shifting laterally or turning about an axis.

I claim:

A horseshoe calk comprising a body having an integral flat sided attaching prong, the free end of which is bifurcated to form branches adapted to spread apart when forced into the shoe, said prong being widened at its base to form shoulders whereby the metal of the shoe is compressed about the prong.

In testimony whereof I affix my signature in presence of two witnesses.

RALPH C. WATROUS.

Witnesses:
   EDWARD M. WHEELER,
   JESSIE W. MCVICAR.

Copies of this patent may be obtained for five cents each, by addressing the "Commissioner of Patents, Washington, D. C."